(12) United States Patent
Zhao et al.

(10) Patent No.: US 8,708,458 B2
(45) Date of Patent: Apr. 29, 2014

(54) SUPEROLEOPHOBIC GLASS DEVICES AND THEIR METHODS

(75) Inventors: Hong Zhao, Webster, NY (US);
Kock-Yee Law, Penfield, NY (US);
Yuanjia Zhang, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 451 days.

(21) Appl. No.: 13/209,836

(22) Filed: Aug. 15, 2011

(65) Prior Publication Data
US 2013/0044162 A1 Feb. 21, 2013

(51) Int. Cl.
*B41J 2/135* (2006.01)
(52) U.S. Cl.
USPC .............................................. 347/44; 347/45
(58) Field of Classification Search
USPC .................................... 347/40, 44, 45, 68–71
See application file for complete search history.

(56) References Cited

U.S. PATENT DOCUMENTS

| 7,905,574 | B2 * | 3/2011 | Silverbrook ................... 347/54 |
| 2011/0157277 | A1 | 6/2011 | Zhao et al. |
| 2013/0076612 | A1 * | 3/2013 | Myers ........................... 345/156 |

OTHER PUBLICATIONS

Bourzac, Katherine. "Flexible Glass for Brighter, Lighter Displays." Technology Review (2010): 1-3. <http://technologyreview.com/computing/25429/?nlid=3043>.
"Coming may follow Taiwan panel makers to set up glass meting tank in China." DIGITIMES. Jan. 12, 2010. Nov. 18, 2011: 2 pages, <http://www.cn-c114.net/579/a475337.html>.
Queste, Samuel, Gwenn Ulliac, Jean-Claude Jeannot and Chantal Khan Malek. "DRIE of non-conventional materials: first results," Multi-Material Micro Manufacture (2008): 4 pages.

* cited by examiner

*Primary Examiner* — Thinh Nguyen
(74) *Attorney, Agent, or Firm* — MH2 Technology Law Group LLP

(57) ABSTRACT

Various embodiments provide materials and methods for a superoleophobic device, which can include a conformal oleophobic coating disposed on glass pillars and/or stripe-shaped glass structures on a glass substrate to provide the device with a textured superoleophobic surface.

20 Claims, 3 Drawing Sheets

SUPEROLEOPHOBIC GLASS DEVICES AND THEIR METHODS

BACKGROUND

Fluid ink jet systems typically include one or more printheads having a plurality of ink jets from which drops of fluid are ejected towards a recording medium. The ink jets of a printhead receive ink from an ink supply chamber or manifold in the printhead which, in turn, receives ink from a source, such as a melted ink reservoir or an ink cartridge. Each ink jet includes a channel having one end in fluid communication with the ink supply manifold. The other end of the ink channel has an orifice or nozzle for ejecting drops of ink. The nozzles of the ink jets may be formed in an aperture or nozzle plate that has openings corresponding to the nozzles of the ink jets. During operation, drop ejecting signals activate actuators in the ink jets to expel drops of fluid from the ink jet nozzles onto the recording medium. By selectively activating the actuators of the ink jets to eject drops as the recording medium and/or printhead assembly are moved relative to one another, the deposited drops can be precisely patterned to form particular text and graphic images on the recording medium.

One difficulty faced by fluid ink jet systems is wetting, drooling or flooding of inks onto the printhead front face. Such contamination of the printhead front face can cause or contribute to blocking of the ink jet nozzles and channels, which alone or in combination with the wetted, contaminated front face, can cause or contribute to non-firing or missing drops, undersized or otherwise wrong-sized drops, satellites, or misdirected drops on the recording medium and thus result in degraded print quality.

Current printhead front face coatings are typically sputtered polytetrafluoroethylene (PTFE) coatings. When the printhead is tilted, the ultra-violet (UV) gel ink (also referred to herein as "UV ink"), at a typical jetting temperature between 75-95° C. and the solid ink at a typical jetting temperature of about 105° C. do not readily slide on the printhead front face surface. Rather, these inks adhere and flow along the printhead front face and leave an ink film or residue on the printhead which can interfere with jetting. For this reason, the front faces of UV and solid ink printheads are prone to be contaminated by UV and solid inks. In some cases, the contaminated printhead can be refreshed or cleaned with a maintenance unit. However, such an approach introduces system complexity, hardware cost, and sometimes reliability issues.

There remains a need for materials and methods for preparing devices having superoleophobic characteristics alone or in combination with superhydrophobic characteristics. Further, while currently available coatings for ink jet printhead front faces are suitable for their intended purposes, a need remains for an improved printhead front face design that reduces or eliminates wetting, drooling, flooding, or contamination of UV or solid ink over the printhead front face; that is ink phobic or oleophobic, and robust to withstand maintenance procedures such as wiping of the printhead front face; and/or that is easily cleaned or self-cleaning, thereby eliminating hardware complexity, such as the need for a maintenance unit, reducing run cost and improving system reliability.

SUMMARY

According to various embodiments, the present teachings include a superoleophobic device. The superoleophobic device can include a glass substrate and a plurality of glass structures disposed on a top surface of the glass substrate to form a plurality of grooves on the top surface. A patterned layer can be disposed on each glass structure of the plurality of glass structures such that the patterned layer overhangs each glass structure. A conformal oleophobic coating can be disposed on portions of the glass substrate, the patterned layer, and the plurality of glass structures to form a textured superoleophobic surface.

According to various embodiments, the present teachings also include a method of forming a superoleophobic device. To form the superoleophobic device, a plurality of patterned layers can be formed on a glass substrate and can be used as an etch mask to etch the glass substrate to form a plurality of etched glass structures. The glass substrate including the plurality of etched glass structures can then be isotropically etched, using the patterned layers as an etch mask, to form a plurality of glass pillars, wherein each patterned layer of the plurality of patterned layers can overhang a corresponding glass pillar of the plurality of glass pillars. An oleophobic coating can be conformally formed on portions of the glass substrate, the plurality of patterned layers, and the plurality of glass structures to form a textured superoleophobic surface.

According to various embodiments, the present teachings further include a method of forming a superoleophobic device. To form the superoleophobic device, patterned layers can be formed on a glass substrate and can be used as an etch mask to anisotropically etch the glass substrate to form a plurality of anisotropically etched glass structures. The glass substrate including the plurality of anisotropically etched glass structures can then be isotropically etched, using the patterned layer as an etch mask, to form a plurality of stripe-shaped glass structures. Each patterned layer of the plurality of patterned layers can overhang a corresponding stripe-shaped glass structure of the plurality of stripe-shaped glass structures. An oleophobic coating can then be conformally formed on portions of the glass substrate, the plurality of patterned layers, and the plurality of stripe-shaped glass structures to form a textured superoleophobic surface.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. The following description is, therefore, merely exemplary.

Various embodiments provide a superoleophobic device and methods for forming and using the superoleophobic device. In one embodiment, an exemplary superoleophobic device can have a textured surface formed by glass pillars and/or stripe-shaped glass structures in/on a glass substrate. The textured surface can then be modified or coated to form a textured superoleophobic surface. In one embodiment, the glass substrate can be a flexible glass substrate and the superoleophobic device can be manufactured by roll-to-roll techniques.

FIGS. 1A-1E depict an exemplary superoleophobic device at various stages of its fabrication in accordance with various embodiments of the present teachings.

Figure 1A:
FIGS. 1A-1E depict an exemplary superoleophobic device at various stages of the fabrication in accordance with various embodiments of the present teachings.

In FIG. 1A, a glass substrate 110 can be provided. The glass substrate 110 can be, e.g., a flexible or a rigid glass substrate. The glass substrate 110 can be transparent or opaque. The glass substrate 110 can be formed from a glass composition including, e.g., fused silica, quartz, soda-lime glass, alkali-aluminosilicate glass (e.g., known as Corning gorilla glass), borosilicate glass (e.g. Pyrex), etc.

The glass substrate 110 can provide optical, thermal, and mechanical properties and/or dimensional stabilities. For example, the glass substrate 110 can be selected to have a density ranging from about 1 g/cm$^3$ to about 4 g/cm$^3$, or from about 1.5 g/cm$^3$ to about 3.5 g/cm$^3$, or from about 2 g/cm$^3$ to about 3 g/cm$^3$, a Young's modulus ranging from about 60 Gpa to about 90 Gpa, or from about 70 Gpa to about 80 Gpa, or from about 70 Gpa to about 76 Gpa, and an average surface roughness, e.g., for over 1 mm$^2$ area, ranging from about 1 nanometer to about 100 nanometers, or from about 2 nanometers to about 90 nanometers, or from about 4 nanometers to about 80 nanometers.

In embodiments, the glass substrate 110 can have a thickness ranging from about 5 micrometers to about 500 micrometers, or from about 10 micrometers to about 200 micrometers, or from about 10 micrometers to about 100 micrometers.

The glass substrate 110 can be provided in a sheet or an endless belt configuration or the like for forming large area devices. For example, the belt width of exemplary glass substrates as well as devices formed there-from (e.g., see FIGS. 2A-2B) can be in the range from about 5 centimeters to about 50 centimeters, or from about 5 centimeters to about 40 centimeters, or from about 5 centimeters to about 30 centimeters.

In one embodiment when a flexible glass substrate is used, the glass substrate 110 can be processed in a continuous platform, such as a roll-to-roll manufacturing for forming the disclosed superoleophobic device. Exemplary flexible glass substrate can include ultra-slim flexible glass from Corning Incorporated (New York).

Figure 1B:
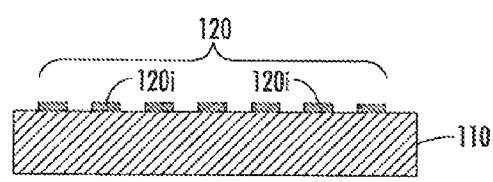

In FIG. 1B, a plurality of patterned layers 120 can be formed on the glass substrate 110, e.g., by using standard photolithographic techniques. The patterned layers 120 can be formed by various materials including, but not limited to, photoresist materials such as SU8 and photosensitive polyimide, dielectric materials such as silicon nitride and aluminum oxide, metals such as Cr and Ni, and semiconductors such as polysilicon.

In an embodiment, the patterned layers 120 can be formed by exposing, developing, and patterning a photoresist layer on a glass substrate using standard photolithographic techniques. In another embodiment, the patterned layers 120 can be formed by patterning dielectric materials or metal materials deposited or formed on a glass substrate using standard photolithographic techniques.

In embodiments, the patterned layers 120 can also be referred to herein as a plurality of top structures 120$i$. Each top structure 120$i$ can have a thickness or height ranging from about 50 nanometers to about 2000 nanometers, or from about 50 nanometers to about 1500 nanometers, or from about 100 nanometers to about 1000 nanometers. Each top structure 120$i$ can have a width or equivalent width (e.g. diameter) ranging from about 1 micrometer to about 20 micrometers, or from about 2 micrometers to about 15 micrometers, or from about 2 micrometers to about 10 micrometers, although the dimensions of the patterned layers 120 are not limited.

Figure 1C:

In FIG. 1C, the patterned layers 120 can be used as an etch mask for forming a plurality of etched glass structures 112 in the glass substrate 110. The plurality of etched glass structures 112 can be formed by various isotropical and/or anisotropical etching techniques. For example, the plurality of etched glass structures 112 can be formed to have vertical sidewalls using various anisotropic etching techniques. Exemplary anisotropic etch can be a plasma etch including a reactive-ion etching (RIE), a deep RIE, an inductively coupled plasma reactive ion etching (ICP-RIE), etc. Various plasma etchants, such as, for example, fluorocarbon ($C_4F_8$/$CF_4$), sulfur hexafluoride ($SF_6$), trifluoromethane ($CHF_3$), nitrogen trifluoride ($NF_3$), and/or combinations thereof can be used to anisotropically etch the glass substrate to form the plurality of anisotropically etched glass structures.

Figure 1D:
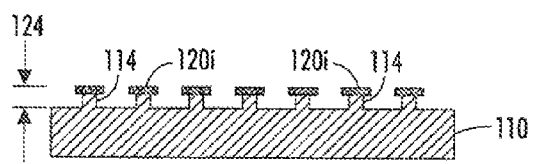

In FIG. 1D, the device shown in FIG. 1C can be further processed to form a second plurality of etched glass structures 114, which are also referred to herein as bottom structures 114 with respect to the top structures 120$i$. In embodiments, the bottom structures 114 can be formed by, e.g., an isotropic etching including a wet etching process, following the etching process depicted in FIG. 1C. The wet etching process can use various etchants of, e.g., hydrofluoric acid (HF), buffered oxide etch (BOE) of ammonium fluoride ($NH_4F$) and hydrofluoric acid (HF), etc. In embodiments, the bottom structures 114 or the etched glass structures can include glass pillars and/or stripe-shaped glass structures that form grooves in x- and/or y-directions in/on a top surface of the glass substrate 110.

In embodiments, the top structure 120$i$ on the bottom structure 114, for example, the anisotropically and isotropically etched glass structure of the glass substrate 110, can provide an overhang re-entrant cross-section 124. Each overhang re-entrant cross-section 124 can include, e.g., a T-shaped structure. The top structure 120$i$ can have a top width greater than a bottom structure 114. The top structure 120$i$ can have a top thickness/height lower than the bottom structure 114.

For example, the bottom structure 114 can have a bottom thickness or height ranging from about 0.2 micrometer to about 10 micrometers, or from about 1 micrometer to about 8 micrometers, or from about 2 micrometers to about 5 micrometers. The bottom structure 114 can have a bottom width or equivalent width ranging from about 0.5 micrometer to about 15 micrometers, or from about 1 micrometer to about 12 micrometers, or from about 1.5 micrometers to about 10 micrometers.

In exemplary embodiments, the device in FIG. 1D can be formed by first forming a plurality of patterned layers 120 on the glass substrate 110, for example, a flexible glass film or belt. The patterned layers 120 can then be used as an etch mask to anisotropically and/or isotropically etch the glass substrate by, e.g., fluorine based ICP (i.e., inductive coupled plasma) etching process ($CHF_3/O_2$). Following the anisotropic etching process, the patterned layers 120 can further be used as an etch mask to isotropically etch the previously etched glass substrate using, e.g., buffered oxide etch (BOE), to form various surface structures, providing desirable textured surfaces. Following the isotropic etching process, a cleaning process such as a piranha cleaning or the like can be optionally performed.

In embodiments, the surface structures of the device in FIG. 1D can include, e.g., one or more of a glass pillar, a stripe-shaped glass structure, and a combination thereof. Each of the formed glass pillars and/or stripe-shaped glass structures can have the overhang re-entrant cross-section 124. In embodiments, each of the glass pillars and/or stripe-shaped glass structures having the overhang re-entrant cross-section 124 can include a patterned layer 120 overhanging each of a plurality of glass structures including a plurality of glass pillars, a plurality of stripe-shaped glass structures, and combinations thereof, to provide a textured surface of FIG. 1D.

Figure 2A:
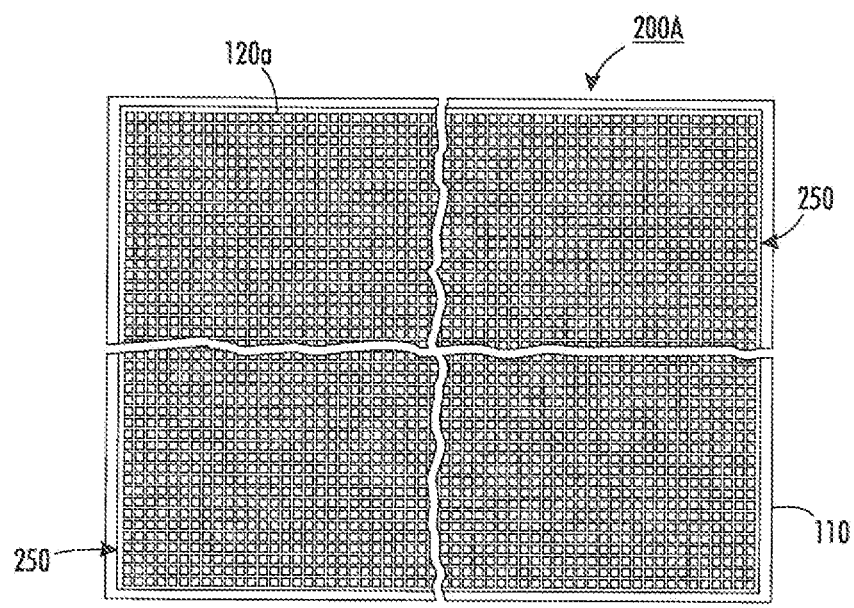
FIGS. 2A-2B depict exemplary top surfaces of the device depicted in FIG. 1D in accordance with various embodiments of the present teachings.
Figure 2B:
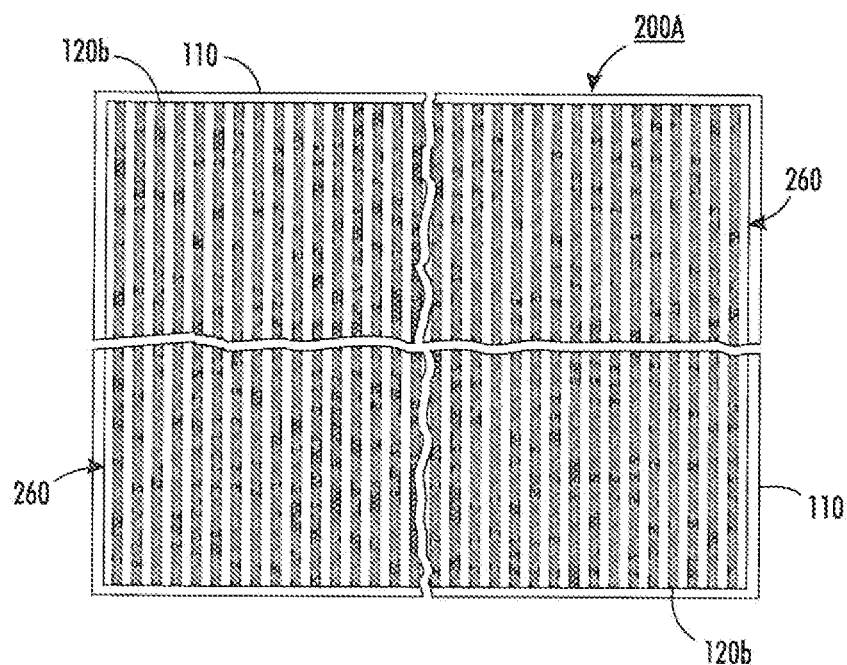

FIGS. 2A-2B depict exemplary top views of the device depicted in FIG. 1D in accordance with various embodiments of the present teachings. The devices 200A-B in FIGS. 2A-2B can be in large area or in a roll form.

In FIG. 2A, the device 200A can have a textured surface formed by a plurality of glass pillars 250 arranged as, for example, pillar arrays, on a glass substrate 110. Each glass pillar can have an overhang re-entrant cross-section (see 124 in FIG. 1D) with a top structure 120a.

In FIG. 2B, the device 200B can have a textured surface formed by a plurality of stripe-shaped glass structures 260 on a glass substrate 110. Each stripe-shaped glass structure can have an overhang re-entrant cross-section (see 124 in FIG. 1D) with a top structure 120b.

Alternatively, instead of being formed in separate devices, both glass pillars and stripe-shaped glass structures can be formed and distributed in one device, in order to provide or adjust surface properties of the formed textured surface.

In embodiments, the glass pillars and/or stripe-shaped glass structures can have suitable shapes, dimensions, spacing, density, and/or solid area coverage. For example, each of the top structure and the bottom structure of each of the glass pillars and stripe-shaped glass structures can have a round, elliptical, square, rectangular, triangle, or star-shape in lateral and/or vertical cross section, although the top structure 120a of the glass pillars 250 in FIG. 2A is shown having a square cross-section, and the top surface 120b of the stripe-shaped glass structures 260 in FIG. 2B is shown having a rectangle cross-section.

In embodiments, the glass pillars and/or stripe-shaped glass structures in one device can have solid area coverage of from about 0.5% to about 40%, or from about 1% to about 30%, or from about 4% to about 20%, over the entire surface area of the glass substrate 110 or device 200A or 200B.

In specific embodiments, the stripe-shaped glass structures 260 can have a configuration designed to form a specific pattern. For example, in embodiments, the stripe-shaped glass structures 260 can have a configuration selected to direct a flow of liquid in a selected flow pattern.

In embodiments, the textured surface formed in FIG. 1D and/or FIGS. 2A-2B can provide a surface roughness and can be oleophobic, ultraoleophobic, superoleophobic, hydrophobic, ultrahydrophobic, and/or superhydrophobic, depending on their structures and arrangements.

Figure 1E:
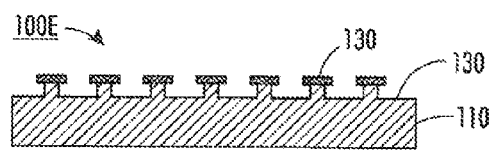

In FIG. 1E, the textured surface of FIG. 1D or FIGS. 2A-2B can be chemically modified to further provide desired surface properties, for example, to enhance the oleophobic quality of the textured surface. Any suitable chemical treatment of the textured surface can be used. For example, a coating 130 of a self-assembled layer including, e.g., perfluorinated alkyl chains, can be deposited on the textured surface of FIG. 1D or FIGS. 2A-2B.

A variety of methods, such as molecular vapor deposition (MVD), chemical vapor deposition (CVD), or solution coating techniques, can be used to deposit the self-assembled layer of perfluorinated alkyl chains onto the textured surface of FIG. 1D or FIGS. 2A-2B. In embodiments, chemically modifying the textured substrate can include chemical modification by conformally self-assembling a fluorosilane coating onto the textured surface. For example, the chemical modification can include disposing layers assembled by a precursor including tridecafluoro-1,1,2,2-tetrahydrooctyltrichlorosilane, tridecafluoro-1,1,2,2-tetrahydrooctyltrimethoxysilane, tridecafluoro-1,1,2,2-tetrahydrooctyltriethoxysilane, heptadecafluoro-1,1,2,2-tetrahydrooctyltrichlorosilane, heptadecafluoro-1,1,2,2-tetrahydrooctyltrimethoxysilane, heptadecafluoro-1,1,2,2-tetrahydrooctyltriethoxysilane, or a combination thereof, and the like, using MVD or the solution coating technique.

The term "conformal" is used herein as known in the art, and refers to a coating designed to conform to the surface of an article or structures being coated. For example, a conformal oleophobic coating (see 130) can be formed conforming to the textured surface in FIG. 1D, i.e., conforming to each exposed surface of the textured surface including: all exposed surfaces of the patterned layers 120/120i, all exposed surfaces of the plurality of glass structures 114, and the top surface of the glass substrate 110. The conformal oleophobic coating can have a thickness substantially uniform on these exposed surfaces.

In other embodiments, chemically modifying the textured substrate can include solution coating a conformal amorphous fluoropolymer onto the textured surface. The amorphous fluoropolymer can be copolymers from tetrafluoroethylene (TFE) and 2,2-bistrifluoromethyl-4,5-difluoro-1,3-dioxole (BDD) monomers. The molar ratio of TFE:BDD in the amorphous fluoropolymer coating can be between 5:95 and 50:50, or between 10:90 and 45:55, or between 15:85 and 36:64. Examples of the conformal amorphous fluoropolymer coating can include DuPont Teflon AF1600 and AF2400.

In this manner, the device 100E formed in FIG. 1E can provide a textured surface that is superoleophobic. In embodiments, the device 100E can have a surface that is both superoleophobic and superhydrophobic.

In a specific embodiment, the device having the textured superoleophobic surfaces herein can be prepared using roll-to-roll web fabrication technology. This embodiment can include creating a flexible device having a textured superoleophobic surface on a roll of flexible glass. For example, a roll including a flexible glass substrate can pass through a first station wherein a layer of photoresist (or dielectric material or metal) can be deposited on the flexible glass substrate, followed by a second station including a masking and exposing/developing station, followed by an etching station, optionally followed by a cleaning station. The textured, flexible roll substrate can then pass through a coating station where the textured, flexible roll substrate can be modified with a conformal oleophobic coating.

A droplet of hydrocarbon-based liquid, for example, hexadecane or ink, can form a super high contact angle with the textured superoleophobic surface (see FIG. 1E), with a contact angle of about 100° or greater, e.g., ranging from about 100° to about 180°, or from about 110° to about 175°, or from about 150° to about 175°. The droplet of a hydrocarbon-based liquid can also form a sliding angle with the disclosed textured superoleophobic surface of less than about 30°, for example, from about 1° to about 30°, or from about 1° to about 20°, or from about 1° to about 10°.

In some cases, a droplet of water can form a high contact angle with the disclosed textured superoleophobic surface in FIG. 1E with a contact angle of about 120° or greater, e.g., ranging from about 120° to about 180°, or from about 130° to about 175°, or from about 140° to about 170°. The droplet of water can also form a sliding angle with the textured superoleophobic surface, such as a sliding angle of from about 1° to about 30°, or from about 1° to about 25°, or from about 1° to about 20°.

In embodiments, hexadecane or ink can have a contact angle with a textured superoleophobic surface of, e.g., from about 110° to about 175°, in either parallel to the groove direction or perpendicular to the groove direction of the glass pillars and/or stripe-shaped glass structures. In further embodiments, hexadecane or ink can have a low sliding angle with the textured superoleophobic surface formed by a conformal oleophobic coating on the glass pillars and/or stripe-shaped glass structures, wherein hexadecane droplets can slide parallel to the groove direction of the textured superoleophobic surface.

In embodiments where the textured superoleophobic devices (see 100E in FIG. 1E) are incorporated with an ink jet printhead front face, jetted drops of ultra-violet (UV) gel ink (also referred to herein as "UV ink"), and/or jetted drops of solid ink can exhibit low adhesion to the textured superoleophobic surface. As used herein, the term "ink drops" refers to the jetted drops of ultra-violet (UV) gel ink and/or jetted drops of solid ink.

The textured superoleophobic devices can therefore be used as an anti-wetting easy clean, self-clean surface device for ink jet printhead front face due to the low adhesion between ink drops and the surface. For example, the textured superoleophobic device 100E in FIG. 1E can be cut, aligned, laminated, and/or bonded to a front face such as a stainless steel aperture plate of an ink-jet printhead.

Figure 3:
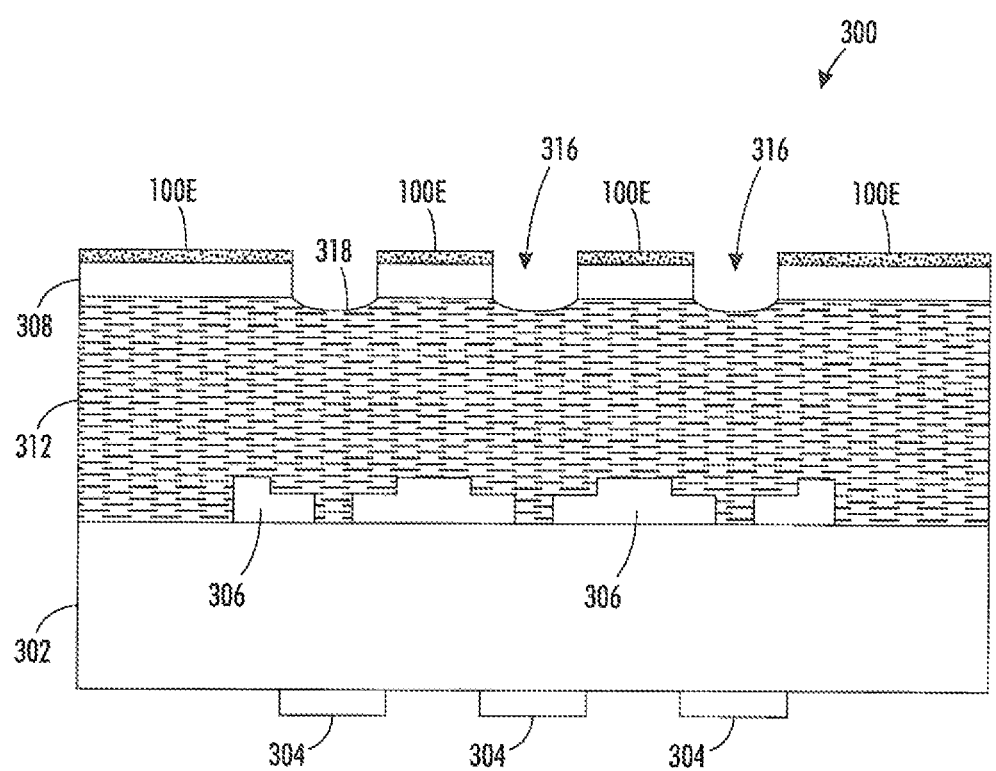
FIG. 3 depicts an exemplary printhead including a superoleophobic device in accordance with various embodiments of the present teachings.

FIG. 3 depicts an exemplary printhead 300 including textured superoleophobic devices in accordance with various embodiments of the present teachings. As shown, the exemplary printhead 300 can include a base substrate 302 with transducers 304 on one surface and acoustic lenses 306 on an opposite surface. Spaced from the base substrate 302 can be a liquid level control plate 308. A textured superoleophobic device 100E in accordance with various embodiments can be disposed along the plate 308. The base substrate 302 and the liquid level control plate 308 can define a channel which holds a flowing liquid 312. The liquid level control plate 308 can contain an array 314 of apertures 316. The transducers 304, acoustic lenses 306, and apertures 316 can be all axially aligned such that an acoustic wave produced by a single transducer 304 can be focused by its aligned acoustics 306 at approximately a free surface 318 of the liquid 312 in its aligned aperture 316. When sufficient power is obtained, a droplet can be emitted from surface 318.

The exemplary printhead 300 can prevent ink contamination because ink droplets can roll off the printhead front face leaving no residue behind due to the textured superoleophobic surface of the device 100E. The textured superoleophobic surface can provide the ink jet printhead aperture plates with high drool pressure due to its superoleophobicity. Generally, the greater the ink contact angle the better (higher) the drool pressure. Drool pressure relates to the ability of the aperture plate to avoid ink weeping out of the nozzle opening when the pressure of the ink tank (reservoir) increases. That is, the textured superoleophobic device 100E described herein can provide low adhesion and high contact angle for ink drops of ultra-violet curable gel ink and/or solid ink, which further provides the benefit of improved drool pressure or reduced (or eliminated) weeping of ink out of the nozzle.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A superoleophobic device comprising:
   a glass substrate;
   a plurality of glass structures disposed on a top surface of the glass substrate to form a plurality of grooves on the top surface;
   a patterned layer disposed on each glass structure of the plurality of glass structures, such that the patterned layer overhangs the each glass structure; and
   a conformal oleophobic coating disposed on portions of the glass substrate, the patterned layer, and the plurality of glass structures to form a textured superoleophobic surface.

2. The device of claim 1, wherein the each glass structure further comprises a glass pillar, a stripe-shaped glass structure, or a combination thereof.

3. The device of claim 1, wherein hexadecane has a contact angle with the textured superoleophobic surface of about 110° to about 175°.

4. The device of claim 1, wherein hexadecane has a sliding angle with the textured superoleophobic surface of from about 1° to about 30°.

5. The device of claim 1, wherein a precursor for the conformal oleophobic coating is tridecafluoro-1,1,2,2-tetrahydrooctyltrichlorosilane, tridecafluoro-1,1,2,2-tetrahydrooctyltrimethoxysilane, tridecafluoro-1,1,2,2-tetrahydrooctyltriethoxysilane, heptadecafluoro-1,1,2,2-tetrahydrooctyltrichlorosilane, heptadecafluoro-1,1,2,2-tetrahydrooctyltrimethoxysilane, heptadecafluoro-1,1,2,2-tetrahydrooctyltriethoxysilane, or a combination thereof.

6. The device of claim 1, wherein the conformal oleophobic coating comprises an amorphous fluoropolymer coating copolymerized from tetrafluoroethylene (TFE) and 2,2-bis-trifluoromethyl-4,5-difluoro-1,3-dioxole (BDD), wherein a molar ratio of TFE:BDD in the amorphous fluoropolymer coating is between 5:95 and 50:50.

7. The device of claim 1, wherein a solid area coverage of the plurality of glass structures over the glass substrate is from about 0.5% to about 40%.

8. The device of claim 1, wherein the patterned layer overhanging the each glass structure has a top width ranging from about 1 micrometer to about 20 micrometers greater than a bottom width ranging from about 0.5 micrometers to about 15 micrometers of the each glass structure.

9. The device of claim 1, wherein the patterned layer overhanging the each glass structure has a top height ranging from about 50 nanometers to about 2000 nanometers lower than a bottom height ranging from about 0.2 micrometer to about 10 micrometers of the each glass structure.

10. The device of claim 1, wherein the glass substrate comprises a flexible glass film having a thickness ranging from about 5 micrometers to about 500 micrometers.

11. The device of claim 1, wherein the glass substrate is a sheet or a belt with a width ranging from about 5 centimeters to about 50 centimeters.

12. The device of claim 1, wherein each of the patterned layer and the plurality of glass structures has a cross-section that is round, elliptical, square, rectangular, triangle, or star-shaped.

13. An ink jet printhead comprising a front face, wherein the front face comprises the device of claim 1.

14. The ink jet printhead of claim 13, wherein ink drops of a solid ink or a UV ink have a contact angle with a surface of the front face of from about 110° to about 175° in either parallel to a groove direction or perpendicular to the groove direction of the textured superoleophobic surface.

15. The ink jet printhead of claim 13, wherein the front face is self-cleaning and wherein ink drops of a solid ink or a UV ink have a low sliding angle with a surface of the front face of from about 1° to about 30°.

16. A method of forming a superoleophobic device comprising:
providing a glass substrate;
forming a plurality of patterned layers on the glass substrate;
etching the glass substrate, using the plurality of patterned layers as an etch mask, to form a plurality of etched glass structures;
isotropically etching the glass substrate comprising the plurality of etched glass structures, using the patterned layer as an etch mask, to form a plurality of glass pillars, wherein each patterned layer of the plurality of patterned layers overhangs a corresponding glass pillar of the plurality of glass pillars; and
conformally forming an oleophobic coating on portions of the glass substrate, the plurality of patterned layers, and the plurality of glass structures to form a textured superoleophobic surface.

17. The method of claim 16, further comprising:
providing the glass substrate that is flexible, and
using roll-to-roll web fabrication technology to prepare the superoleophobic device.

18. The method of claim 16, wherein the step of conformally forming an oleophobic coating comprises a solution coating of an amorphous fluoropolymer copolymerized from tetrafluoroethylene and 2,2-bis-trifluoromethyl-4,5-difluoro-1,3-dioxole.

19. A method of forming a superoleophobic device comprising:
providing a glass substrate;
forming a plurality of patterned layers on the glass substrate;
anisotropically etching the glass substrate, using the plurality of patterned layers as an etch mask, to form a plurality of anisotropically etched glass structures;
isotropically etching the glass substrate comprising the plurality of anisotropically etched glass structures, using the patterned layer as an etch mask, to form a plurality of stripe-shaped glass structures, wherein each patterned layer of the plurality of patterned layers overhangs a corresponding stripe-shaped glass structure of the plurality of stripe-shaped glass structures; and
conformally forming an oleophobic coating on portions of the glass substrate, the plurality of patterned layers, and the plurality of stripe-shaped glass structures to form a textured superoleophobic surface.

20. The method of claim 19, wherein hexadecane has a low sliding angle with the textured superoleophobic surface of less than about 30°, wherein hexadecane droplets slide parallel to a groove direction of the textured superoleophobic surface.

* * * * *